(12) United States Patent
Reuschel et al.

(10) Patent No.: US 8,172,059 B2
(45) Date of Patent: May 8, 2012

(54) CLUTCH SYSTEM

(75) Inventors: Michael Reuschel, Ottersweier (DE); Thomas Rammhofer, Sasbach (DE)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 450 days.

(21) Appl. No.: 12/396,092

(22) Filed: Mar. 2, 2009

(65) Prior Publication Data

US 2009/0218190 A1    Sep. 3, 2009

(30) Foreign Application Priority Data

Mar. 3, 2008    (DE) .................. 10 2008 012 368

(51) Int. Cl.
*F16D 48/02*    (2006.01)
*F16D 25/08*    (2006.01)
*F16D 25/12*    (2006.01)

(52) U.S. Cl. .................. 192/85.55; 192/85.6; 192/85.63

(58) Field of Classification Search ............... 192/85.63, 192/85.6, 85.55

See application file for complete search history.

(56) References Cited

U.S. PATENT DOCUMENTS

| 5,678,673 | A  | * | 10/1997 | Borschert et al. | ............ 192/84.6 |
| 6,896,112 | B2 | * | 5/2005 | Berger et al. | ................ 192/52.4 |
| 7,059,128 | B2 | * | 6/2006 | Rammhofer | .................... 60/588 |
| 7,350,634 | B2 | * | 4/2008 | Baehr et al. | ................ 192/85.51 |

FOREIGN PATENT DOCUMENTS

DE    10 2005 027 602    2/2006

* cited by examiner

*Primary Examiner* — David D Le
*Assistant Examiner* — Jacob S Scott
(74) *Attorney, Agent, or Firm* — Lucas & Mercanti, LLP; Klaus P. Stoffel

(57) ABSTRACT

The clutch system relates to an automatic friction clutch with a hydrostatically actuator-controlled clutch withdrawal. In such clutch release systems, a slave cylinder pressurized by a master cylinder in an engaged state is in connection with a reservoir (tank) via a connection opening uncovered by the master cylinder piston. To determine the opening deviations and location of the connection opening, it is proposed that actuation of master cylinder be velocity-dependent and pressure patterns of the hydrostatic clutch release system be evaluated.

5 Claims, 2 Drawing Sheets

CLUTCH SYSTEM

This application claims the priority of DE 10 2008 012 368.4 filed Mar. 3, 2008 which is incorporated by reference herein.

BACKGROUND OF THE INVENTION

The invention relates to a clutch system featuring an automated friction clutch with a hydraulic clutch withdrawal system, which is activated by an actuator controlled by a control unit.

Clutch systems with automated friction clutches are well known. In the case of a friction clutch activated hydrostatically by means of a hydraulic clutch withdrawal system, a master cylinder is activated by an actuator, for instance an electric motor. The master cylinder transmits the pressure generated by the master cylinder via a pressure line to the slave cylinder, which, by means of an axially displaceable piston and under interposition of a release bearing on a lever system, can constitute a diaphragm spring that pressurizes a non-rotatably and axially displaceable pressure plate connected with a clutch cover and locks against a clamping-load plate firmly connected with a clutch cover. A clutch disc with friction linings is disposed between the clamping-load plate and pressure plate, which, depending on the tension between the clamping-load and pressure plate, constitute a friction lock-up and close the friction clutch or open it upon release of the friction lock-up.

The actuator is controlled by a control unit that feeds the actuator with signal values owing to the calibration data backed-up in the control unit, for instance clutch characteristic curves; said signal values effect pre-set travel on the friction clutch. In the process, the travel in the action chain of the clutch withdrawal system, for instance, directly inside the actuator, is determined and corrected by considering the ratios between the friction clutch and sensor. In this manner, torque to be transmitted via the friction clutch can be assigned to the traveled distance.

In the case of a hydraulic clutch withdrawal system, the hydraulic section is exposed to external influences, for instance temperature or friction linings wear which lead to variation of the pressure medium volume. A connection opening—a so-called snifting groove—to a reservoir (tank) is therefore provided in the master cylinder. When an opened friction clutch is involved, opened by pressurizing the slave cylinder piston and whilst the friction clutch is closed, the connection opening can be uncovered by moving the master cylinder piston in the resting position and pressure can be equalized. When a closed friction clutch is involved, pressure can be equalized in a fully opened friction clutch, because the master cylinder piston is then in a resting position and uncovers the connection opening. In general, the connection opening is controlled by means of the master cylinder piston that uncovers the opening when passing a seal. The seal in this case is formed as a static U-seal. The master cylinder piston features axial grooves for its actuation, on its front side opposite the piston rod; these axial grooves uncover the connection opening when passing the seal. Depending on the influencing parameters, for instance the tolerance chain of the master cylinder, the state of seal wear etc., the connection opening can be uncovered at different actuation travels of the master cylinder piston, which make difficult or even impossible to obtain definite correlation between the actuation signal transmitted from the control unit to the actuator and the actually set clutch travel.

SUMMARY OF THE INVENTION

Object of the invention is therefore to advantageously develop a clutch system with an automated friction clutch and thus to provide an improved correlation of the actuator travel to the clutch travel.

The object of the invention is met by a clutch system with an automatically actuated friction clutch in that by means of a hydrostatic clutch withdrawal system comprising a slave cylinder, a master cylinder is connected with and pressurizes the slave cylinder via a pressure line, in that the master cylinder in the state of rest uncovers a connection opening to a reservoir (tank) by means of a master cylinder piston, wherein deviations of an opening pattern of the connection opening are detected, in that the pressure pattern of the clutch withdrawal system is determined in dependence upon the actuation velocity of the master cylinder piston. This solution is based on the perception that starting from a resting position of the master cylinder piston, for instance an electrical resting position determined by the control unit, at which calibration of the actuator can take place, actuation of the master cylinder at a very slow velocity can cause full expulsion of excess pressure medium through the connection opening and pressure is developed on the slave cylinder only after the connection opening is closed. On the contrary, when starting from the resting position of the master cylinder piston at a very high, for instance, maximum velocity of the actuator, then, less pressure medium will be expelled through the connection opening, for instance, owing to the viscosity of the pressure medium or owing to a changed sealing characteristic of the seal between the master cylinder and master cylinder piston, so that, for smaller actuation travels, pressure will already be developed inside the clutch withdrawal system. By evaluating the pressure ratios at different velocities, the difference in distance between the resting position and the beginning of pressure build-up, at which the clutch withdrawal system begins, can transmit pressure to the slave cylinder, when the velocity of the actuator is preset, which begins to move the diaphragm spring tongues of the friction clutch, so that direct correlation between the distance traveled by the actuator and the clutch travel is possible, which can be clarified through the travel of diaphragm spring tips.

Evaluation of pressure ratios depending on actuation travel can take place by means of a pressure sensor integrated in the clutch withdrawal system, for instance, in the master or slave cylinder or in the pressure line. Thus, it has been proven that close disposition of the pressure sensor on the connection opening is particularly advantageous for determining the pressure development.

According to a further inventive concept, the location of the connection opening or rather of the virtual location of a point at which the clutch withdrawal system for a preset velocity of the master cylinder piston begins to initiate movement of the diaphragm spring tongues can be determined by comparison of the location of a sensing point on the friction clutch at different actuation velocities of the master cylinder piston. Such determination can occur redundantly besides the measured values established by the pressure sensor or alternatively when a pressure sensor is not provided. The sensing-point setting in the process requires a certain pressure on the slave cylinder, so that, also here, indirect pressure measurement can occur without a pressure sensor. When the sensing point is determined consecutively within a short time, for instance within a minute, then a change of the sensing point can be ruled out under normal conditions within this time interval.

A further method of evaluation can be an iterative approximation to the connection opening, starting from the resting position, wherein closure of the connection opening will be detected when the pressure patterns of actuations with a fast and a slow velocity no longer differ from one another.

The proposed direct or indirect evaluation of pressure patterns can be used moreover for diagnostic purposes by determination of sensing points. If no difference is found, for instance, between fast and slow actuation velocity then it can happen that the resting position is shifted so far in the closing direction of the friction clutch, so that no pressure equalization occurs with the reservoir (tank). Thus, an output of a warning signal and/or an entry in an error memory can occur. If the distance determined between the resting position and connection opening lies above an expected value, the danger exists that a mechanical limit stop of the master cylinder piston on the master cylinder housing occurs, which can lead to damage in the long-term, so that here also an output of a warning signal and/or an entry in an error memory can occur.

BRIEF DESCRIPTION OF THE DRAWINGS

The invention is explained in detail, using FIGS. 1 to 4, as follows.

DETAILED DESCRIPTION OF THE DRAWINGS

Figure 1:
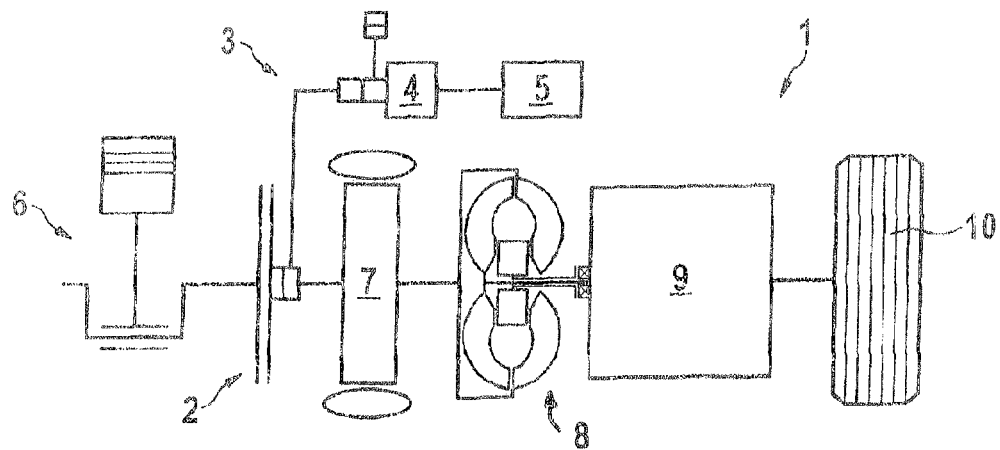
FIG. 1 is a schematically depicted drive train with a clutch system

FIG. 1 is an exemplary embodiment of a schematically depicted drive train 1, whose friction clutch 2 is actuated by means of an automatically automated hydraulic clutch withdrawal system 3, by an actuator 4, which is activated by a control unit 5. The drive train 1 is a hybrid drive train with an internal combustion engine 6 and an electric machine 7, which can be connected by means of the friction clutch 2 with the internal combustion engine 6 and by means of a torque converter 8 with the transmission 9 The electric machine 7 is disposed on the transmission side and can drive the vehicle on its own, when a friction clutch 2 is open, via the drive wheels 10 or recuperate in deceleration operation. When disconnected from the transmission 9 by means of a torque converter clutch or at low rotation speeds at which the torque converter, owing to its operation principle, can only transmit negligible torque, with a closed friction clutch 2, the internal combustion engine 6 can be started directly by means of the electric machine 7 or with an initially opened friction clutch 2 and after the electric machine 7 has accelerated to a start-up rotation speed with a closed clutch 2 using the pulse technique. Such an operation poses high demands on the hydraulic clutch withdrawal system 3, in which certain correlation exists between the actuation travel computed by the control unit 5 and output to the actuator 4 and that executed by said actuator. Such a drive train 1 is controlled advantageously so that centrifugal forces generated on the friction clutch 2, in particular of the lever-system (not visible on this schematic illustration), is considered and any disadvantageous effects generated are eliminated.

Figure 2:
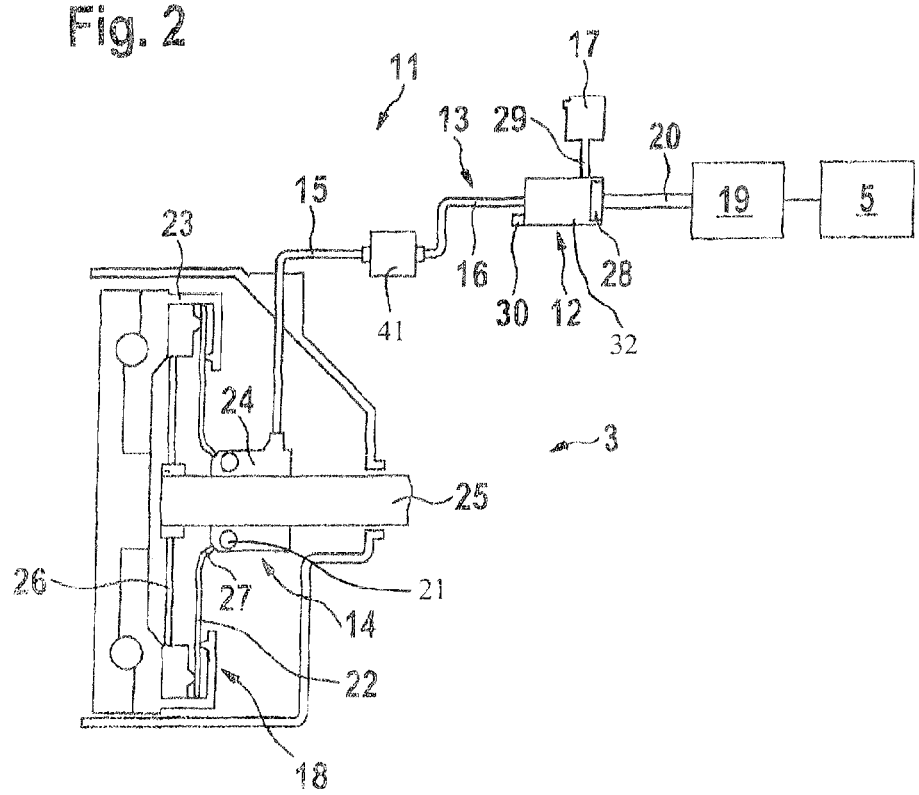
FIG. 2 shows a clutch system

FIG. 2 depicts a possible embodiment of a clutch system 11 schematically, with a clutch withdrawal system 3, a master cylinder 12 and a slave cylinder 14 connected by means of a line 13 with the master cylinder. A filter 41 that can serve as a pressure-limiting valve and/or as a so-called anti-vibration unit can be installed between the line parts 15 and 16 (as shown) or can be integrated inside the master or slave cylinder.

The hydraulic clutch withdrawal system 3 actuates the friction clutch 18 of the clutch system 11 hydraulically by pressurizing the master cylinder 12 by means of the actuator 19, which is activated by the control unit 5. In this manner, pressure is developed inside the master cylinder 12 and fed via line 13 into the slave cylinder 14, which is formed as a concentric slave cylinder; by means of mechanical transmission 20, for instance a piston rod on which the master cylinder piston 28 is axially disposed in a slidable manner. Via a releasing bearing 21, the slave cylinder 14 applies the required releasing force to the friction clutch 18, or rather to its lever system 22, for instance a diaphragm spring or an actuation lever. The type of locking of the lever system with the clutch cover 23 determines whether a closed or an open friction clutch is involved. Thus, the friction clutch release bearing 21 is pressurized, which pressurizes the lever tips 27 of the lever system, for instance a diaphragm spring, which is opened by the slave cylinder piston 24 or in the case of a closed friction clutch (not depicted)—is closed by the slave cylinder piston 24. The transmission input shaft 25, with a closed friction clutch 18, transmits the torque—not depicted—of the internal combustion engine connected non-rotatably with the friction clutch via the clutch disc 26 to a transmission—not explained in detail—and finally to the drive wheels of a vehicle.

In the depicted resting state of clutch withdrawal system 3, the master cylinder piston 28 is located in a resting position 31, output from the control unit 5 to the actuator, said resting position being spatially distanced from a mechanical limit stop of the master cylinder piston 28 on a housing 32 of the master cylinder 12. The actuator 19 is calibrated on this resting position relative to its electrical zero position. In the resting position 31 of the master cylinder 12 the master cylinder piston 28 uncovers a connection opening 29 to the reservoir (tank) 17, so that pressure equalization can take place, in that excess pressure medium will be sucked anew or can be expelled in case of excess pressure in the reservoir (tank). Pressure equalization is necessary, particularly for changing the operation temperatures owing to a temperature-dependent expansion of the pressure medium and the determinant volume of the clutch withdrawal system 3 when determining the components such as lines, master and slave cylinders. Still, pressure medium loss will be compensated from the reservoir (tank) and air-bubbles expelled to it. Through the actuator 19, targeted compensation can be carried out, a so-called snifting, in that the master cylinder piston 28 is pulled back to the resting position. Should pressure equalization not be carried out, the master cylinder piston 28 will only be moved back to a position in which the friction clutch 18 is indeed fully disengaged, but the connection opening 29, however, is not yet uncovered by the master cylinder piston 28. In this manner, the actuation processes can be executed faster due to shortened actuation distances.

Particularly for this purpose, the exact knowledge of the position of the connection opening 29 relative to the resting position 31 is advantageous. The control variable output by the control unit 5 to the actuator 19 is converted by the actuator 19 into a distance variable Through the tolerances in the master cylinder 12 and/or other influence variables, for instance, the actuation velocity of actuator 19, the operation temperature of the clutch withdrawal system 3, and thus of the viscosity of the pressure medium, wear of master cylinder piston 28 and of corresponding seals, temperature and aging-dependent material changes and the likes, the distance between the resting position 31 and complete closure of the connection opening 29 can vary. Therefore, this distance will be determined for the pre-set actuation velocity of the actuator 19. For this purpose, at least two stokes of the master cylinder piston 28 will be performed at different actuation velocities of the actuator 19. Thereby, for very slow movement, typically meaning an actuation velocity of the master cylinder between 2 and 5 mm/s, the pressure pattern is determined over the actuation travel of the friction clutch 18, of the master cylinder piston 28 or of the actuator 19, wherein clutch travels not directly measured on the friction clutch 18 can be converted into the actual clutch travel by measuring other variables allowing for respectively effective transmission ratios between these and the clutch travel. After or prior to determining the pressure pattern for a slow actuation process, actuation with a faster actuation velocity, for instance 80 to 120 mm/s is carried out and the travel-dependent pressure pattern is determined. From the difference between the distances at which pressure development starts, it is possible to deduce the distance between the resting position 31 and the connection opening 29 for a typical actuation velocity of the actuator. If for instance the difference between the two actuations is equal to or near zero, it can be assumed that the connection opening 29 is not or is only slightly run over by the master cylinder piston and therefore is only partially opened. Therefore, it is possible in the control unit 5 to correct the resting position 31 accordingly, opposite the actuation direction of the master cylinder piston 28, to actuate the friction clutch 18. If the distance is too large then the resting position 31 in actuation direction of the master cylinder piston 28 can be corrected, in order to avoid a limit stop in the resting position 31 of the master cylinder piston 28 on the housing of the master cylinder 12.

Alternatively, iterative actuation of the master cylinder can take place to determine the location of the connection opening 29 relative to the resting position 31, in that, starting from the resting position 31 cycles of fast and slow actuations are carried out with reduction of the distance from the resting position 31 to the connection opening 29 for so long until the pressure patterns of the fast and slow actuation no longer differ. Then it can be assumed that the connection opening 29 is closed. A desired distance from this closed position can then be saved in the control unit as a new resting position 31.

A pressure sensor 30 can serve as a means of detection—as shown—on master cylinder 12 or as can be shown at another point in the clutch withdrawal system 3. Alternatively, the pressure pattern on the friction clutch 18 can be determined directly, in that the location of the contact point of the friction clutch 18 assumed as constant during the actuations to be carried out is evaluated. The contact point is determined by slowly closing the friction clutch 18, as soon as predetermined torque, for instance 4 Nm, is transmitted via the friction clutch 18. The transmission of torque can be derived from a characteristic of the internal combustion engine 6, for instance readjustment of the idling speed, a change of the injected amount of fuel or of the combustion air volume, or a change of rotational speed of the transmission input shaft or a change of the induced or output torque of the electric machine 7.

Figure 3:
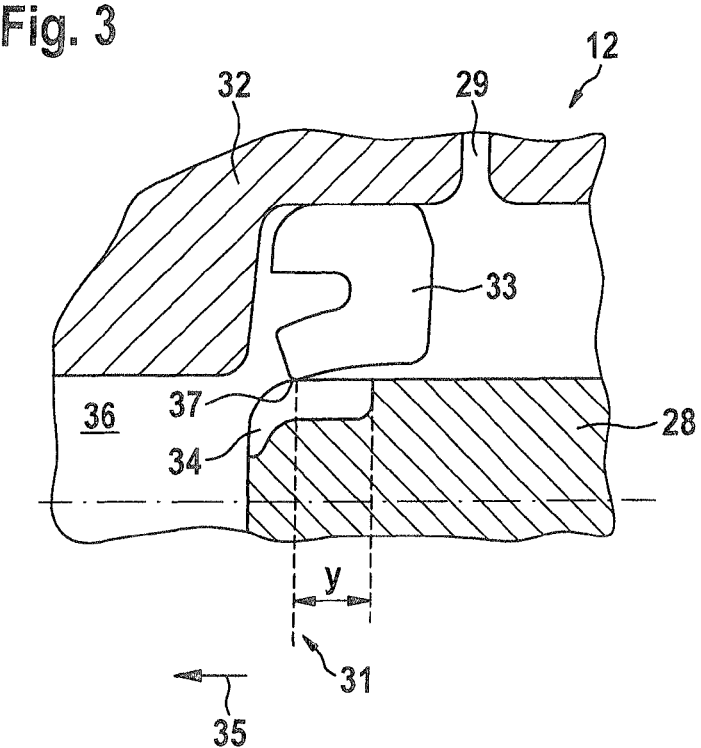
FIG. 3 shows a detail of a master cylinder.

FIG. 3 shows a sectional detail of the master cylinder 12 with the master cylinder piston 28 and a U-seal 33 sealing the housing 32 of the master cylinder 12 against the piston. The master cylinder piston 28 features a so-called snifting groove 34, on its front side, which by displacement of the master cylinder piston 28 opposite to the actuation direction 35 in the resting position 31 of the master cylinder piston 28 uncovers a connection opening 29 between the pressure chamber 36 and a reservoir (tank)—not depicted. The distance y from a closing state of the snifting groove 34 and the resting position correspond to a travel range, in which the connection opening 29 transforms from the resting position 31 to a completely closed state. In the depicted position of the master cylinder piston 28, the resting position 31, pressure equalization takes place between the pressure chamber 36 and reservoir (tank). If the resting position 31, as a result of system tolerances, is axially displaced relative to the sealing edge 37 of the U-seal 33 or of the sealing edge 37 relative to the resting position 31, the connection opening 29, due to contact with the sealing edge 37 on the master cylinder piston 28, can already be partially or fully closed outside the snifting groove 34, so that pressure equalization is only possible partially or not at all, or the master cylinder piston can be displaced opposite to the actuation direction as a result of an erroneous adaptation of the resting position and hence it can cause long uncovering distances and pose danger of collision of the opposite side of piston with the housing 32. Accordingly—as already described under FIG. 3—respectively fast and slow actuations of the master cylinder piston 28 will occur in the actuation direction 35, with evaluation of the pressure pattern via the completed actuation travel.

Figure 4:
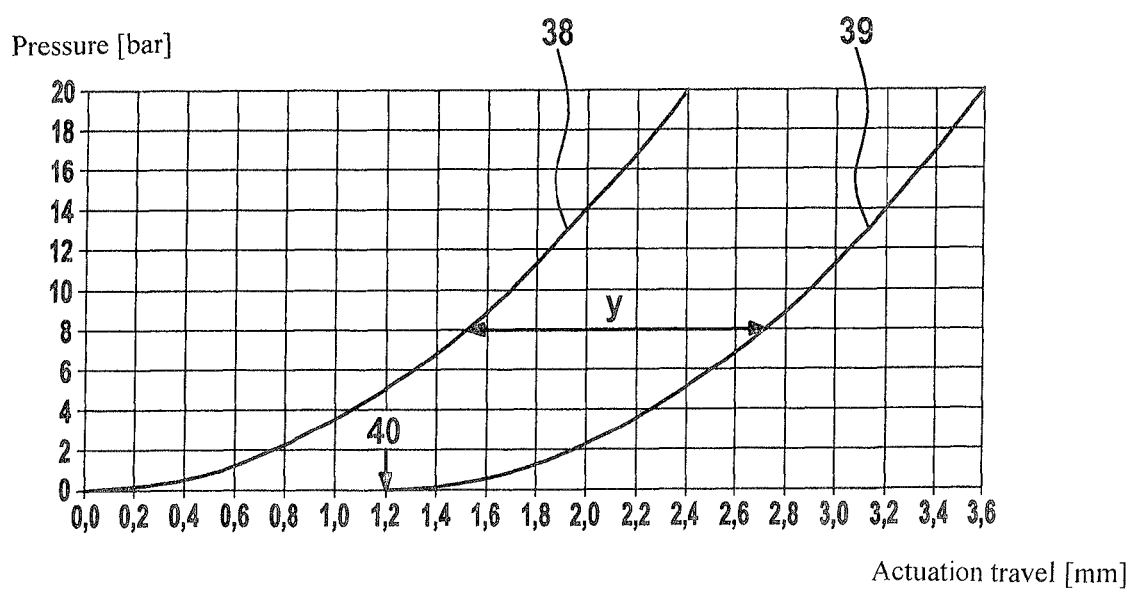
FIG. 4 shows a sequence for controlling a clutch system.

FIG. 4 shows two typical pressure patterns 38, 39 over the actuation travel of a friction clutch. Thus, the pressure pattern 38 shows the development of pressure, for instance, inside the pressure chamber 36 of FIG. 3 during fast actuation, for instance, at approx. 100 mm/s. Pressure builds up starting from the resting position for actuation travel equal to zero, since, owing to the fast movement of the master cylinder piston, an immediate sealing effect of U-seal 33 (FIG. 3) comes into play. In contrast to this, pressure equalization is possible at a slow actuation rate, for instance with 4 mm/s, of the master cylinder piston, for complete closure of the snifting groove 34 (Figure), so that in accordance with the depicted pressure pattern 39, the pressure first begins to increase after complete closure of the snifting groove 34 for actuation travel, designated with the arrow 40. In a rough approximation the axial length between the resting position 31 and the complete closure of the snifting groove 34, FIG. 3) can therefore be determined from distance y of the two pressure patterns 38, 39.

LIST OF REFERENCE SYMBOLS 1 drive train
2 friction clutch
3 clutch withdrawal system
4 actuator
5 control unit
6 internal combustion engine
7 electric machine
8 torque converter
9 transmission
10 drive wheel
11 clutch system
12 master cylinder
13 line
14 slave cylinder
15 line part
16 line part
17 reservoir (tank)
18 friction clutch
19 actuator
20 mechanical transmission
21 releasing hearing
22 lever system 23 clutch cover
24 slave cylinder piston
25 transmission input shaft
26 clutch disc
27 lever tip
28 master cylinder piston
29 connection opening
30 pressure sensor
31 resting position
32 housing
33 U-seal
34 snifting groove
35 actuation direction
36 pressure chamber
37 sealing edge
38 pressure pattern
39 pressure pattern
40 arrow
41 filter
y distance

What we claim is:

1. A clutch system with friction clutch automatically actuated by an actuator having a hydrostatic clutch withdrawal system, comprising:
 a control unit activating the actuator;
 a slave cylinder; and
 a master cylinder connected with and pressurizing said slave cylinder through a line, the master cylinder including a resting state, wherein a master cylinder piston is positioned to uncover a connection opening to a reservoir, and the master cylinder piston is actuated according to a pressure pattern to cover and uncover the connection opening at different actuation travels,
 wherein pressure patterns of the clutch withdrawal system are determined and dependent upon an actuation velocity of the master cylinder piston, and
 wherein, in the pressure pattern of the master cylinder piston, starting from the resting state, cycles of fast and slow actuations of the master cylinder piston are performed in an actuation direction with increasing displacement from a starting point in the actuation direction, in order to determine closure of the connection opening through a distance that tends to zero relative to an actuation travel.

2. The clutch system according to claim 1, wherein the master cylinder piston is actuated at least at two different velocities when actuated according to the pressure pattern such that the connection opening is transformed from an uncovered state and a covered state by the master cylinder piston.

3. The clutch system according to claim 2, wherein the pressure patterns are evaluated by means of a pressure sensor disposed on the clutch withdrawal system.

4. The clutch system according to claim 2, wherein the pressure patterns are determined by comparison of locations of a sensing point on the friction clutch after the master cylinder passes over the connection opening at different velocities.

5. The clutch system according to claim 1, wherein the connection opening is opened and closed by means of a snifting groove located on one side of the master cylinder piston and in connection with a U-seal fixed on a housing and dependent on distance covered by the master cylinder piston.

* * * * *